(12) United States Patent
Kim

(10) Patent No.: US 11,254,366 B2
(45) Date of Patent: Feb. 22, 2022

(54) VEHICLE BODY JOINT STRUCTURE

(71) Applicants: Hyundai Motor Company, Seoul (KR); Kia Motors Corporation, Seoul (KR)

(72) Inventor: Do Hoi Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 8 days.

(21) Appl. No.: 16/891,694

(22) Filed: Jun. 3, 2020

(65) Prior Publication Data
US 2021/0179195 A1  Jun. 17, 2021

(30) Foreign Application Priority Data
Dec. 12, 2019  (KR) .................... 10-2019-0165972

(51) Int. Cl.
| | | |
|---|---|---|
| *B62D 25/08* | (2006.01) | |
| *B62D 27/02* | (2006.01) | |
| *B62D 25/02* | (2006.01) | |
| *B62D 25/20* | (2006.01) | |
| *B62D 21/11* | (2006.01) | |
| *B62D 25/06* | (2006.01) | |
| *B62D 21/15* | (2006.01) | |

(52) U.S. Cl.
CPC .............. *B62D 25/08* (2013.01); *B62D 21/11* (2013.01); *B62D 25/02* (2013.01); *B62D 25/06* (2013.01); *B62D 25/2036* (2013.01); *B62D 27/023* (2013.01); *B62D 21/15* (2013.01)

(58) Field of Classification Search
CPC ...... B62D 25/04; B62D 25/06; B62D 25/025; B62D 27/023
USPC .............. 296/203.01–203.04, 193.06–193.08
See application file for complete search history.

(56) References Cited

U.S. PATENT DOCUMENTS

2007/0102964 A1 *  5/2007  Yoshimoto ........... B62D 21/157
                                                              296/187.12

FOREIGN PATENT DOCUMENTS

| DE | 102015205402 A1 * | 9/2016 | ............. B62D 65/02 |
|---|---|---|---|
| EP | 1382513 A2 * | 1/2004 | ............. B62D 25/04 |
| JP | 2011136621 A * | 7/2011 | |
| KR | 20140091510 A | 7/2014 | |

* cited by examiner

*Primary Examiner* — Dennis H Pedder
(74) *Attorney, Agent, or Firm* — Slater Matsil, LLP

(57) ABSTRACT

A vehicle body joint structure includes a lower panel disposed on a side surface of a floor assembly, an upper panel extending upward from the lower panel and connected to a roof assembly for a roof of a vehicle body, and a connection pipe extending vertically to connect the floor assembly to the roof assembly, disposed to face the upper panel, and coupled to the upper panel.

20 Claims, 7 Drawing Sheets

VEHICLE BODY JOINT STRUCTURE

CROSS-REFERENCE TO RELATED APPLICATIONS

This application claims priority to Korean Patent Application No. 10-2019-0165972, filed on Dec. 12, 2019, which application is hereby incorporated herein by reference.

TECHNICAL FIELD

The present disclosure relates to a vehicle body joint structure.

BACKGROUND

A filler of a vehicle is divided into a front pillar, a center pillar, and a rear pillar according to a position of the pillar and serves an important role not only in supporting a roof of the vehicle and but also in improving rigidity and safety of a vehicle body.

In designing as a monocoque type, a conventional filler has a structure in which multiple mold parts are combined and has excellent rigidity, but it is almost impossible as a design part to implement a vehicle of various designs or to share each segment.

Alternatively, in the existing monocoque structure, an entirety of the front pillar can be designed with one inner member and a draw mold of an outer member. However, the existing monocoque structure has expandability which is almost impossible to connect with other parts and a new mold for each design should be developed.

That is, a large number of design changes are required at the time of small quantity batch production or production through a smart factory, and thus there is a problem that a production cost is inevitably increased due to a significant increase in the number of molds.

Accordingly, there is a need for a vehicle body having a new structure or a pillar structure which is capable of securing rigidity and expandability for connection with other parts while overcoming disadvantages.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind problems occurring in the related art, and the present disclosure relates to a vehicle body joint structure. Embodiments of the present disclosure provide a vehicle body joint structure capable of securing expandability for connection with other parts by changing a structure of a rear pillar.

According to one embodiment, there is provided a vehicle body joint structure including a lower panel disposed on a side surface of a floor assembly, an upper panel configured to extend upward from the lower panel and connected to the roof assembly constituting a roof of a vehicle body, and a connection pipe configured to vertically extend to connect the floor assembly to the roof assembly and disposed to face the upper panel to be coupled thereto.

[soon] The floor assembly may include a floor having side seals on both sides and a wheel mounting part which is disposed rearward from the side seal of the floor and to which a wheel is mounted, and the lower panel may be coupled to the wheel mounting part.

The wheel mounting part may include a rear side member configured to extend rearward from the side seal, a panel part coupled to an upper side of the rear side member and formed to have an area, a horizontal member part coupled to an upper end of the panel part and extending in the same direction as the rear side member, and a vertical member part configured to vertically extend to cross the panel part and connect the rear side member to the horizontal member part.

The lower panel may be formed in a shape in which an upper end portion of the lower panel is coupled to the upper panel, and a lower end portion thereof surrounds the wheel mounted to the wheel mounting part.

A support configured to surround a lower portion of the connection pipe may be formed in an upper end portion of the lower panel.

An edge from an upper end portion to a lower end portion of the lower panel may be matched along an edge of the wheel mounting part to be coupled thereto.

The connection pipe may be formed in a polygonal shape having a closed cross section, and an extension end portion configured to extend to an outer surface of the connection pipe to overlap the connection pipe may be formed on the upper panel.

Facing surfaces of the upper panel and the connection pipe may be matched to each other to be coupled.

The vehicle body joint structure may further include a bracket including one end portion coupled to the upper panel and the other end portion coupled to the connection pipe to connect the upper panel to the connection pipe.

The connection pipe may be provided as a plurality of connection pipes, and the plurality of connection pipes may be disposed in a direction facing the upper panel.

The vehicle body joint structure may further include a side outer formed to surround the lower panel, the upper panel, and the connection pipe and coupled to the lower panel, the upper panel, and the connection pipe while surrounding the lower panel, the upper panel, and the connection pipe from the outside.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF ILLUSTRATIVE EMBODIMENTS

Hereinafter, a vehicle body joint structure according to exemplary embodiments of the present disclosure will be described with reference to the accompanying drawings.

Figure 1:
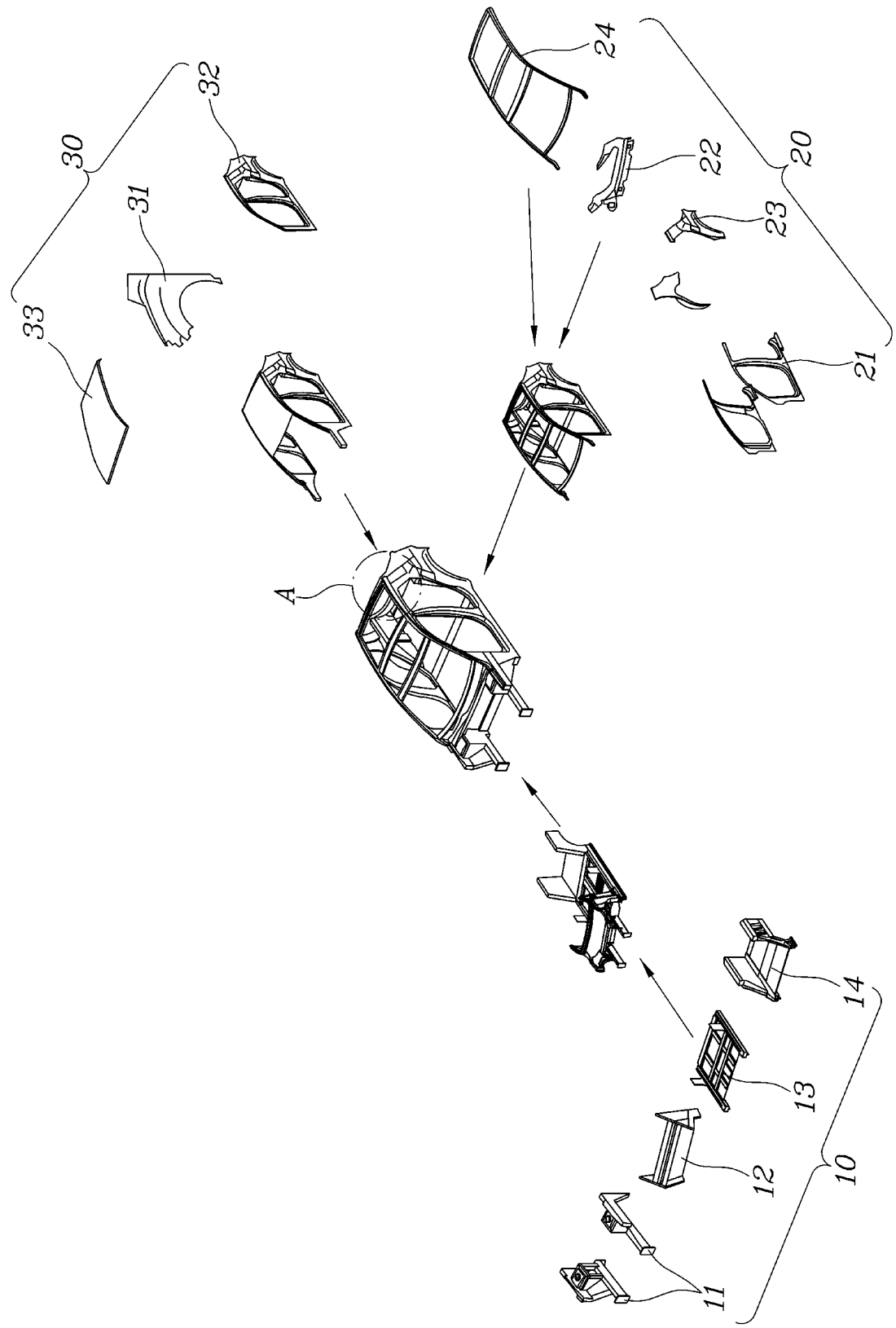
FIG. 1 is a diagram illustrating a vehicle body joint structure according to embodiments of the present disclosure.

FIG. 1 is a diagram illustrating a vehicle body joint structure according to embodiments of the present disclosure, and FIGS. 2 to 8 are diagrams for describing a rear pillar structure according to the vehicle body joint structure shown in FIG. 1.

The present disclosure relates to a modularized vehicle body. For example, as shown in FIG. 1, in configuring the modularized vehicle body, a front apron assembly 11, a dash assembly 12, a center floor assembly 13, and a rear floor assembly 14 constitute a floor assembly 10, and a front lower panel 21, a rear side assembly 23, a back assembly 22, and a roof assembly 24 constitute an upper assembly 20. In a state in which the floor assembly 10 and the upper assembly 20 are assembled, when a skin assembly 30 including a fender 31, a side outer 32, and a roof panel 33 may be coupled to the floor assembly 10 and the upper assembly 20, the modularized vehicle body may be formed.

The above-described modularized vehicle body is one example, and this example is only for aiding understanding of the modularized vehicle body. When a vehicle body is actually formed, an assembly order and each configuration may be changed.

Figure 2:
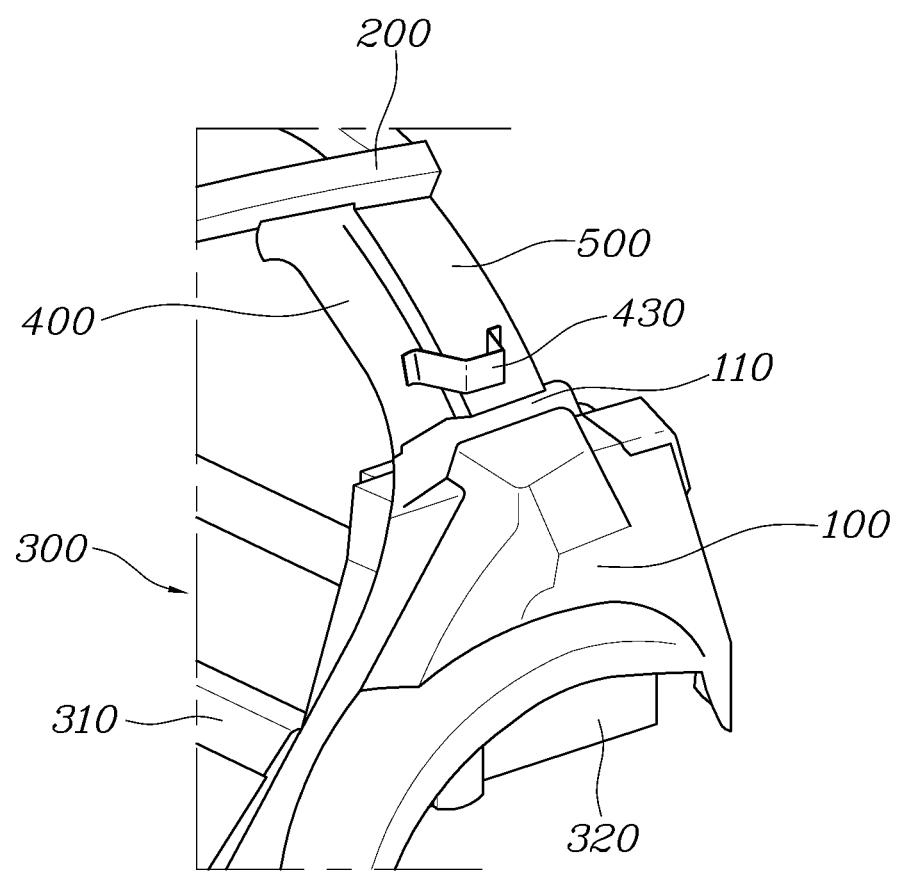
FIGS. 2 to 8 are diagrams for describing a rear pillar structure according to the vehicle body joint structure shown in FIG. 1.

Embodiments of the present disclosure relate to a connection structure between the rear side assembly 23 and the roof assembly 24 which constitute the upper assembly. That is, as shown in FIG. 2, an embodiment of the present disclosure includes a lower panel 100 disposed on a side surface of a floor assembly 300, an upper panel 400 extending upward from the lower panel 100 and connected to a roof assembly 200 constituting a vehicle body roof, and a connection pipe 500 extending vertically to connect the floor assembly 300 to the roof assembly 200 and disposed to face the upper panel 400 and to be coupled to the upper panel 400. The lower panel 100 and the upper panel 400 correspond to the rear side assembly 23 in the above-described upper assembly 20.

Here, the floor assembly 300 includes a floor 310 constituting a bottom surface of the vehicle body, and the lower panel 100 is coupled to a side of the floor assembly 300. In particular, the upper panel 400 is coupled above the lower panel 100 and extends upward from the lower panel 100 to be connected to the roof assembly 200. The upper panel 400 may be a C-pillar which is a rear pillar and formed as a "C"-shaped frame having a vertical surface extending vertically and side surfaces bent at both sides of the vertical surface. Accordingly, the upper panel 400 may extend or contract in a length direction to be easily applied to a variety of types and models of vehicles.

The connection pipe 500 vertically extends to connect the floor assembly 300 to the roof assembly 200 and is disposed to face the upper panel 400 to be coupled thereto. The connection pipe 500 may have the same shape as the upper panel 400 or may be formed to have a polygonal shape. Further, facing surfaces of the upper panel 400 and the connection pipe 500 match to be coupled to each other so that secure support rigidity of the upper panel 400 and the connection pipe 500 is secured. Accordingly, the connection pipe 500 may extend or contract in a length direction to be easily applied to a variety of types and models of vehicles.

As described above, as a configuration for supporting the roof assembly 200 with respect to the floor assembly 300, an upper portion of the upper panel 400 is coupled to the roof assembly 200 and a lower portion thereof is coupled to the lower panel 100 which is coupled to the floor assembly 300, an upper portion of the connection pipe 500 is coupled to the roof assembly 200 and a lower portion thereof is coupled to the floor assembly 300 so that support rigidity and rigidity of the roof assembly 200 are secured due to the upper panel 400 and the connection pipe 500. Further, lengths of the upper panel 400 and the connection pipe 500 are varied to be easily applied to a variety of types of vehicles.

Figure 3:
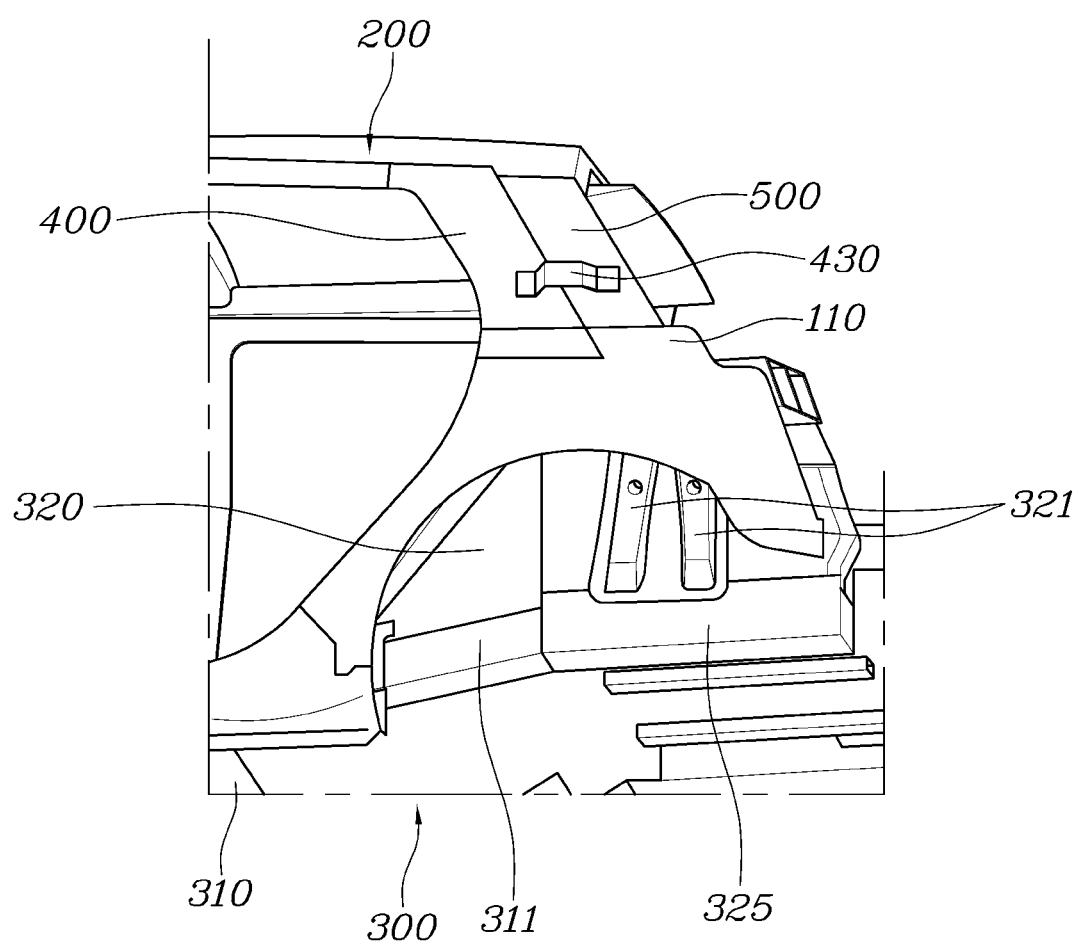

In describing the embodiments of the present disclosure in detail, as shown in FIG. 3, the floor assembly 300 may include a floor 310 having side seals 311 on both sides thereof and a wheel mounting part 320 extending rearward from the side seals 311 of the floor 310, and the lower panel 100 may be coupled to the wheel mounting part 320.

As described above, the floor assembly 300 is comprised of the floor 310 having the side seals 311 on both sides thereof and the wheel mounting part 320 extending rearward from the floor 310. Here, in addition to the side seals 311, the floor 310 may be comprised of a cross member and the like, but is not shown. The rear wheel mounting part 320 is formed behind the side seals 311 of the floor 310. The wheel mounting part 320 is formed to have a predetermined area such that a wheel is mountable, and a rib part 321 may be formed to reinforce rigidity of a portion at which the wheel is mounted. As described above, the floor 310 and the wheel mounting part 320 may be integrally formed and manufactured, and, since the floor 310 and the wheel mounting part 320 are integrally formed, strength and rigidity are secured.

The above-described wheel mounting part 320 may include a rear side member 325 extending rearward from the side seals 311, a panel part 322 coupled on the rear side member 325 and formed to have an area, a horizontal member part 323 coupled to an upper portion of the panel part 322 and extending in the same direction as the rear side member 325, and a vertical member part 324 extending to vertically cross the panel part 322 and configured to connect the rear side member 325 to the horizontal member part 323.

Figure 4:
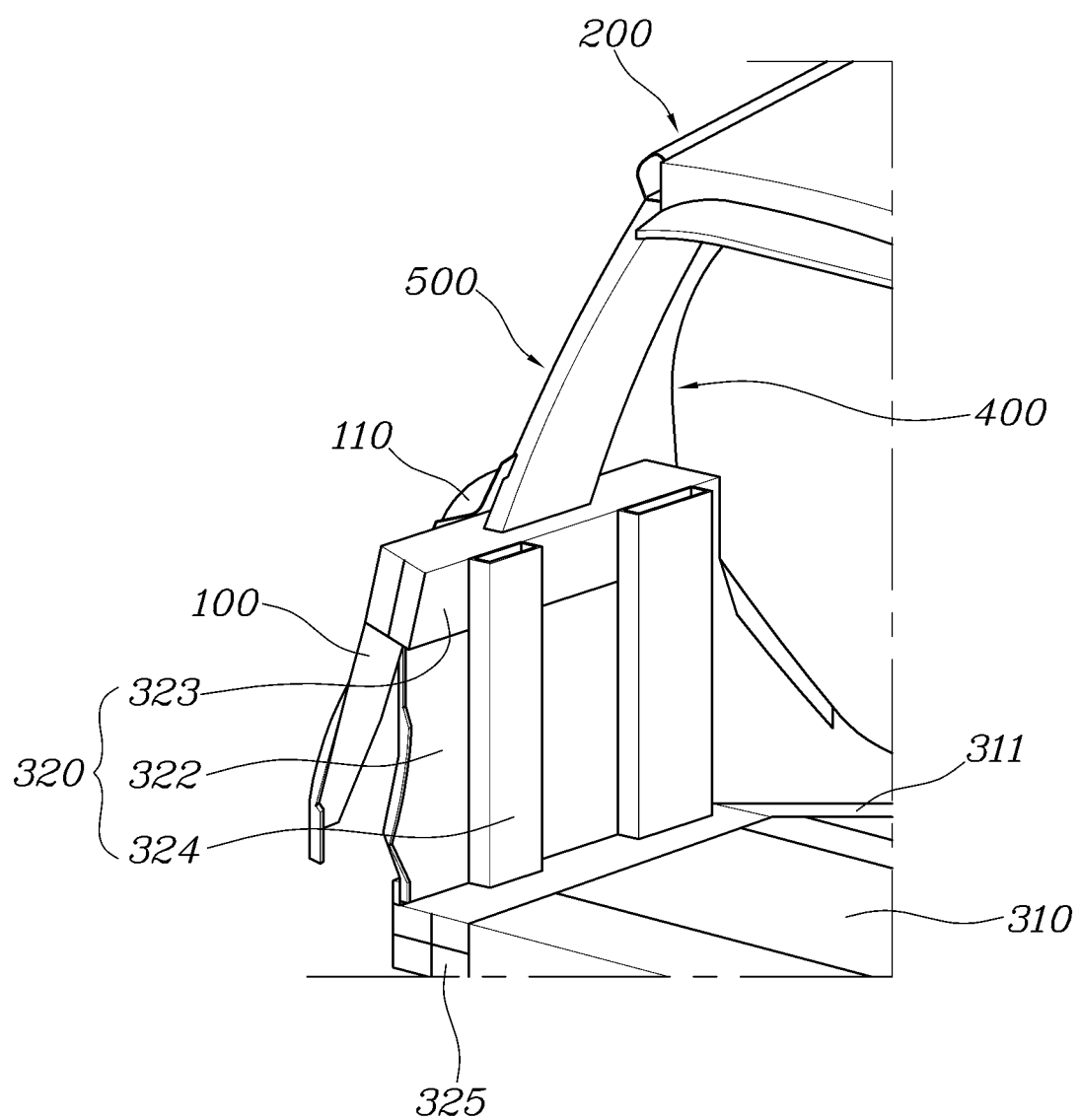

As shown in FIG. 4, the wheel mounting part 320 is comprised of the rear side member 325, the panel part 322, the horizontal member part 323, and the vertical member part 324. Here, the rear side member 325 may be coupled to a rear side of the side seals 311 and formed to have a closed cross section. The panel part 322 is formed to have an area and partitions an interior space and an exterior space of the vehicle, and the wheel is mounted to the panel part 322. The horizontal member part 323 is formed at an upper end of the panel part 322. The horizontal member part 323 extends in an extending direction of the rear side member 325 while forming a closed cross section.

Further, since the horizontal member part 323 forms a closed cross section so that strength of the horizontal member part 323 is secured, when the connection pipe 500 is coupled upward, the horizontal member part 323 together with the connection pipe 500 may support the roof assembly 200.

Further, since the horizontal member part 323 and the rear side member 325 are connected by the vertical member part 324 extending vertically to cross the panel part 322, support rigidity against a vertical load is increased. Consequently, the wheel mounting part 320 secures support rigidity in a vertical direction to firmly support the roof assembly 200, and, since strength of the wheel mounting part 320 is secured, stability against a collision is improved.

Meanwhile, an upper end portion of the lower panel wo may be coupled to the upper panel 400, and a lower end portion thereof may be formed in a shape surrounding a wheel which will be mounted to the wheel mounting part 320.

The upper panel 400 is coupled to the upper end portion of the lower panel 100 by welding or riveting, and the lower end portion of the lower panel 100 may be cut in a circular shape in consideration of geometry of the wheel which will be mounted to the wheel mounting part 320. Further, since the lower panel 100 is configured as a separate component and coupled to a side of the floor assembly 300, a degree of design freedom is secured.

A support no for surrounding a lower portion of the connection pipe 500 may be formed on the upper end portion of the above-described lower panel 100, and the lower portion of the connection pipe 500 may be coupled to the support 110.

Figure 5:
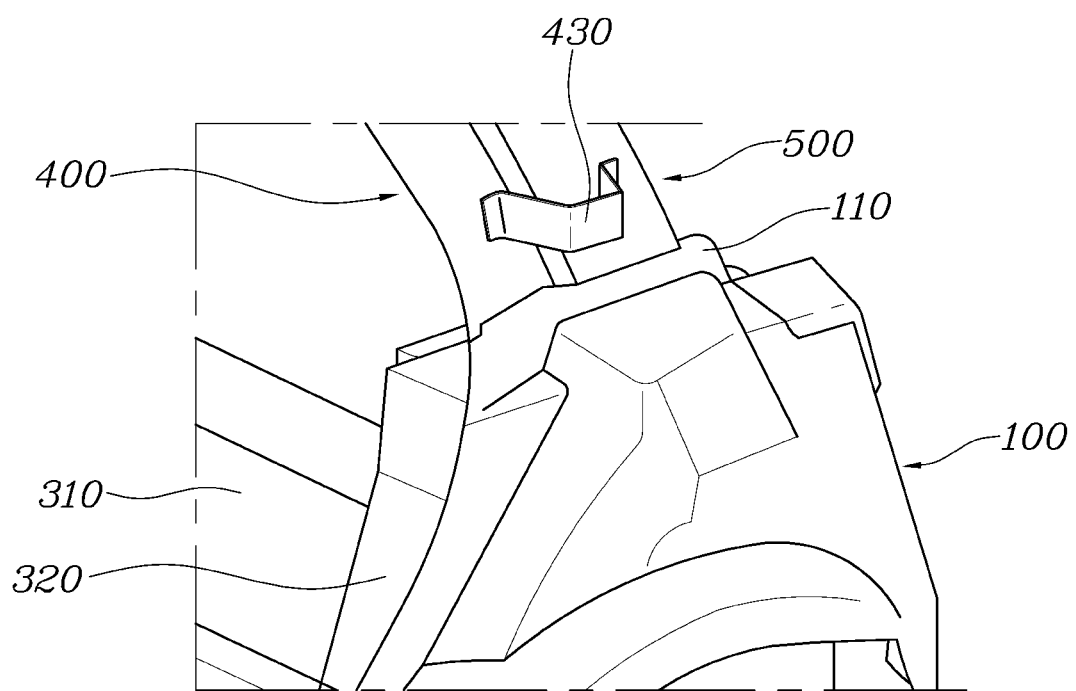

As shown in FIG. 5, since the lower portion of the connection pipe 500 is surrounded by the support no at the upper end portion of the lower panel 100, a structure in which the connection pipe 500 is supported through the support no is formed so that a rigid coupling structure may be formed. Here, since the support 110 of the lower panel 100 is coupled to the connection pipe 500 in a state of surrounding the lower portion of the connection pipe 500, coupling rigidity of the lower panel 100 is secured and support strength of the connection pipe 500 is increased.

Further, since the support 110 of the lower panel 100 is matched to the connection pipe 500, when the lower panel 100 is coupled to the floor assembly 300, a fixed position is determined so that ease of manufacturing is improved.

An edge from the upper end portion to the lower end portion of the lower panel 100 may be matched along an edge of the wheel mounting part 320 to be coupled to the wheel mounting part 320. That is, the lower panel 100 may be formed to correspond to a shape of an outer edge of the wheel mounting part 320, and the edge of the lower panel 100 may be coupled and fixed to the edge of the wheel mounting part 320 by welding or riveting. Here, the upper end portion of the lower panel 100 may include the upper panel 400 and the connection pipe 500 and may be coupled to an upper portion of the wheel mounting part 320. One end portion of the lower panel 100 may be coupled to a front lower portion of the wheel mounting part 320, and the end portion thereof may be coupled to a rear end portion of the wheel mounting part 320 in the upper portion thereof. As described above, some points of the lower panel 100 are coupled to the wheel mounting part 320 so that degradation in durability due to an excessive increase of the coupling portion is prevented and an inclined or curved portion is avoided to secure ease of a coupling work.

Figure 6:
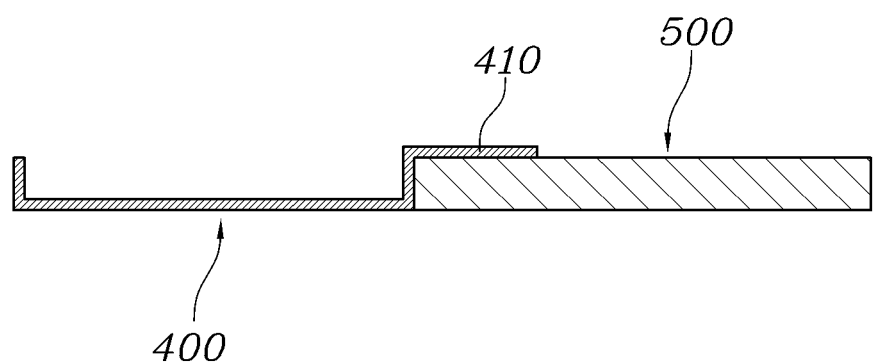

Meanwhile, as shown in FIG. 6, the connection pipe 500 may be formed in a polygonal shape having a closed cross section, and an extension end portion 410 extending to an outer surface of the connection pipe 500 to overlap the connection pipe 500 may be formed in the upper panel 400.

As described above, since the connection pipe 500 is formed in the polygonal shape having the closed cross section, rigidity of the connection pipe 500 is secured. Alternatively, the connection pipe 500 may be formed in a "C" shape in which some surfaces are open like the upper panel 400. However, since the connection pipe 500 should secure strength as being connected to the floor assembly 300 and a bar of the roof assembly 200, it is preferable that the connection pipe 500 is formed in a polygonal shape having a closed cross section.

Further, the extension end portion 410 extending to the outer surface of the connection pipe 500 is formed on the upper panel 400 and overlaps the connection pipe 500 so that coupling rigidity between the upper panel 400 and the connection pipe 500 is improved. Further, a structure in which the connection pipe 500 is supported through the extension end portion 410 of the upper panel 400 is formed so that solid support strength may be formed.

Meanwhile, as shown in FIG. 5, a bracket 430 may be provided such that one end portion of the bracket 430 is coupled to the upper panel 400 and the other end portion thereof is coupled to the connection pipe 500, thereby connecting the upper panel 400 to the connection pipe 500. The bracket 430 may be located at an intermediate portion of the upper panel 400 and the connection pipe 500. Since the bracket 430 connects the upper panel 400 to the connection pipe 500, coupling rigidity between the upper panel 400 and the connection pipe 500 is secured. Further, since the bracket 430 is able to be coupled to other parts in a state of being coupled to the upper panel 400 and the connection pipe 500, when an outer is coupled to other part, coupling rigidity may be secured.

Meanwhile, the connection pipe 500 may be provided as a plurality of connection pipes 500 to be disposed in a direction facing the upper panel 400.

Figure 7:
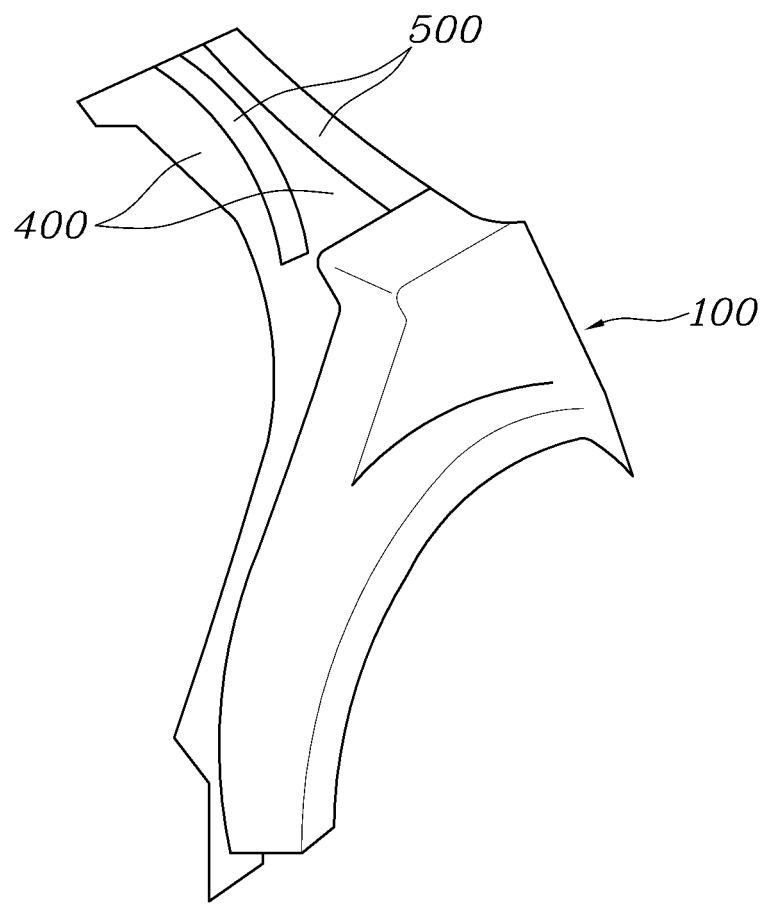

This is another example according to the connection structure between the upper panel 400 and the connection pipe 500. As shown in FIG. 7, the connection pipes 500 may be provided as a plurality of connection pipes 500 and coupled to the upper panel 400 in a state of being disposed in the direction facing the upper panel 400. Consequently, a degree of freedom of coupling between the upper panel 400 and the connection pipe 500 is improved, and additional rigidity may be easily secured according to the number of connection pipes 500.

Figure 8:
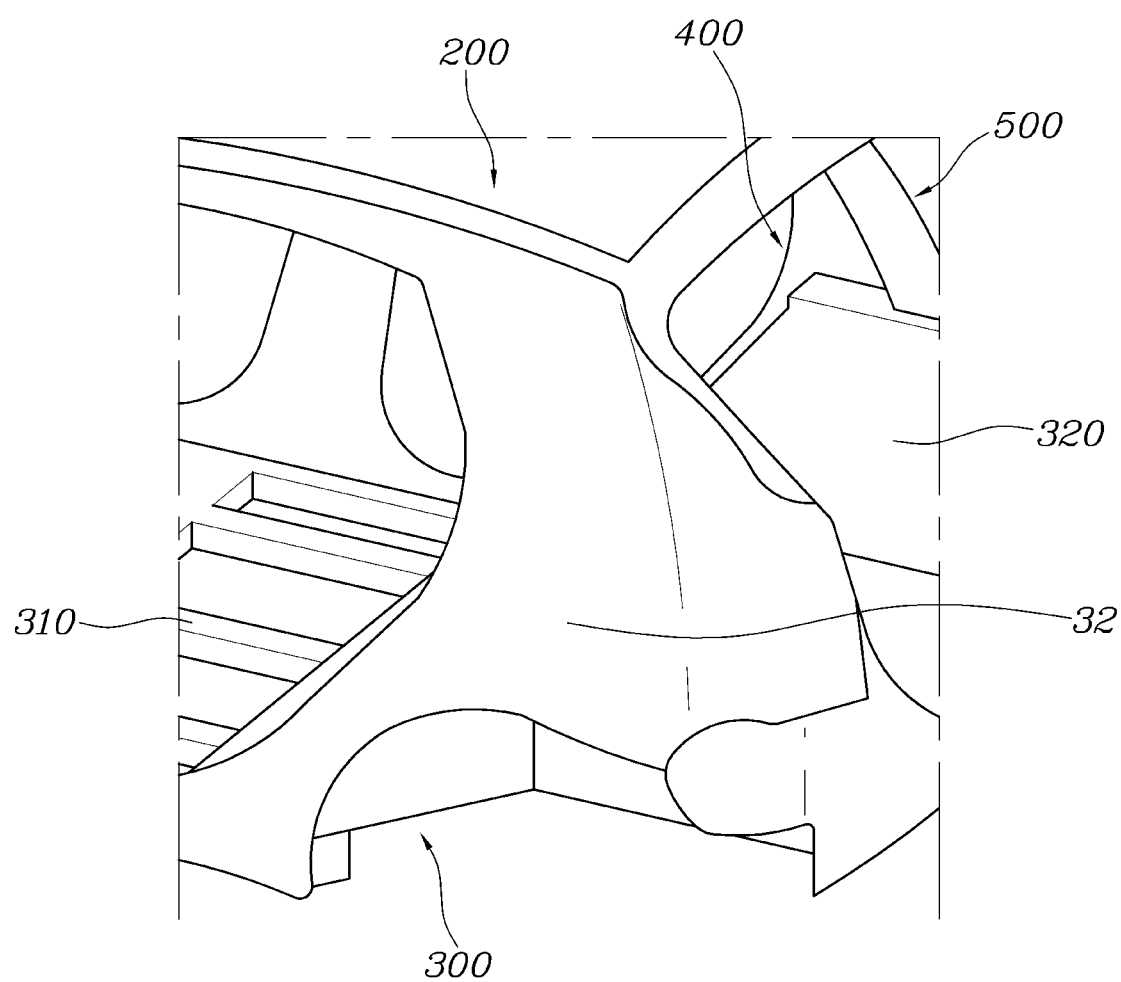

Meanwhile, as shown in FIG. 8, the side outer 32 may be formed to surround the lower panel 100, the upper panel 400, and the connection pipe 500 and coupled to the lower panel 100, the upper panel 400, and the connection pipe 500 while surrounding the lower panel 100, the upper panel 400, and the connection pipe 500 from the outside. As described above, the lower panel 100 is coupled to the roof assembly 200 through the upper panel 400 in a state of being coupled to the floor assembly 300, and, in a state in which the connection pipe 500 is coupled to the floor assembly 300 and the roof assembly 200, the side outer 32 is coupled to the lower panel 100, the upper panel 400, and the connection pipe 500 while surrounding the lower panel 100, the upper panel 400, and the connection pipe 500 so that a coupling structure to which strength and rigidity are added may be formed. Further, an exterior shape of the vehicle is determined according to a design of the side outer 32 so that the design may be easily changed.

The vehicle body joint structure formed in the above-described structure may be easily commonly used in various types of vehicles by easily configuring a required pillar structure of the vehicle while not requiring or minimizing the development of a separate new mold. Consequently, it is easy to develop a new type of vehicle and it is efficient even in small quantity batch production. Further, rigidity and assemblability of the roof are secured.

Although preferred embodiments of the present disclosure have been described for illustrative purposes, those skilled in the art will appreciate that various modifications, additions and substitutions are possible, without departing from the scope and spirit of the present disclosure as disclosed in the accompanying claims.

What is claimed is:
1. A vehicle body joint structure, comprising:
a floor assembly comprising a floor, side sills on two sides of the floor, and a wheel mounting part disposed rearward from the side sills of the floor;
a lower panel disposed on a side surface of the floor assembly, the lower panel being coupled to the wheel mounting part;
an upper panel extending upward from the lower panel and connected to a roof assembly for a roof of a vehicle body;
a connection pipe extending vertically to connect the floor assembly to the roof assembly, disposed to face the upper panel, and coupled to the upper panel; and a wheel mounted to the wheel mounting part, wherein the wheel mounting part comprises:
   a rear side member configured to extend rearward from the side sills;
   a panel part coupled to an upper side of the rear side member and having an area;
   a horizontal member part coupled to an upper end of the panel part and extending in a same direction as the rear side member; and
   a vertical member part extending vertically to cross the panel part and connect the rear side member to the horizontal member part.

2. The vehicle body joint structure of claim 1, wherein the lower panel is formed in a shape in which an upper end portion of the lower panel is coupled to the upper panel, and a lower end portion of the lower panel surrounds the wheel mounted to the wheel mounting part.

3. The vehicle body joint structure of claim 1, further comprising a support formed in an upper end portion of the lower panel, the support surrounding a lower portion of the connection pipe.

4. The vehicle body joint structure of claim 1, wherein an edge extending from an upper end portion to a lower end portion of the lower panel is matched along an edge of the wheel mounting part, wherein the edge of the lower panel is coupled to the edge of the wheel mounting part.

5. The vehicle body joint structure of claim 1, wherein the connection pipe has a polygonal shape having a closed cross section, and an extension end portion extending to an outer surface of the connection pipe to overlap the connection pipe is formed on the upper panel.

6. The vehicle body joint structure of claim 1, wherein facing surfaces of the upper panel and the connection pipe are matched to each other to be coupled.

7. The vehicle body joint structure of claim 1, further comprising a bracket including a first end portion coupled to the upper panel and a second end portion coupled to the connection pipe to connect the upper panel to the connection pipe.

8. The vehicle body joint structure of claim 1, wherein the connection pipe comprises a plurality of connection pipes, and each of the plurality of connection pipes is disposed in a direction facing the upper panel.

9. The vehicle body joint structure of claim 1, further comprising:
   a side outer surrounding the lower panel, the upper panel, and the connection pipe and coupled to the lower panel, the upper panel, and the connection pipe from the outside.

10. A vehicle comprising:
   a floor assembly comprising a floor, side sills on two sides of the floor, and a wheel mounting part extending rearward from the side sills;
   a roof assembly;
   an upper assembly having a lower panel coupled to a side of the floor assembly and an upper panel extending upward from the lower panel, wherein an upper portion of the upper panel is coupled to the roof assembly and a lower portion of the upper panel is coupled to the lower panel; and
   a connection pipe extending vertically, wherein an upper portion of the connection pipe is coupled to the roof assembly and a lower portion of the connection pipe is coupled to the floor assembly;
   wherein the wheel mounting part comprises:
   a rib part;
   a rear side member extending rearward from the side sills;
   a panel part coupled on the rear side member, wherein a wheel is mounted to the panel part;
   a horizontal member part coupled to an upper portion of the panel part and extending in a same direction as the rear side member; and
   a vertical member part extending to vertically cross the panel part and connecting the rear side member to the horizontal member part.

11. The vehicle of claim 10, wherein the upper panel has a C-shaped frame having a vertical surface and side surfaces bent at both sides of the vertical surface.

12. The vehicle of claim 10, wherein the connection pipe has a polygonal shape.

13. The vehicle of claim 10, wherein facing surfaces of the upper panel and the connection pipe match to couple the upper panel and the connection pipe.

14. A vehicle body joint structure, comprising:
   a floor assembly including a floor, side sills on both sides of the floor, and a wheel mounting part disposed rearward from the side sills;
   a lower panel disposed on a side surface of the floor assembly and coupled to the wheel mounting part;
   an upper panel extending upward from the lower panel and connected to a roof assembly for a roof of a vehicle body;
   a connection pipe vertically extending to connect the floor assembly to the roof assembly, disposed to face the upper panel, and coupled to the upper panel; and
   a support in an upper end portion of the lower panel, the support surrounding a lower portion of the connection pipe.

15. The vehicle body joint structure of claim 14, wherein the wheel mounting part includes:
   a rear side member configured to extend rearward from the side sills;
   a panel part coupled to an upper side of the rear side member and having an area;
   a horizontal member part coupled to an upper end of the panel part and extending in a same direction as the rear side member; and
   a vertical member part extending vertically to cross the panel part and connect the rear side member to the horizontal member part.

16. The vehicle body joint structure of claim 14, further comprising a bracket including a first end portion coupled to the upper panel and a second end portion coupled to the connection pipe.

17. The vehicle body joint structure of claim 14, wherein the lower panel is formed in a shape in which an upper end portion of the lower panel is coupled to the upper panel, and a lower end portion of the lower panel surrounds a wheel mounted to the wheel mounting part.

18. The vehicle body joint structure of claim 14, wherein an edge extending from an upper end portion to a lower end portion of the lower panel is matched along an edge of the wheel mounting part, wherein the edge of the lower panel is coupled to the edge of the wheel mounting part.

19. The vehicle body joint structure of claim 14, wherein the connection pipe has a polygonal shape having a closed cross section, and an extension end portion extending to an outer surface of the connection pipe to overlap the connection pipe is formed on the upper panel.

20. The vehicle body joint structure of claim 14, wherein facing surfaces of the upper panel and the connection pipe are matched to each other to be coupled.

* * * * *